Feb. 9, 1971  W. F. MAIDMENT  3,562,061
METAL WOOL PAD MAKING APPARATUS
Filed May 17, 1966  7 Sheets-Sheet 1

INVENTOR.
WILLIAM FRANK MAIDMENT
BY
Strauch, Nolan, Neale,
Nies & Bronaugh
ATTORNEYS

INVENTOR.
WILLIAM FRANK MAIDMENT
BY Strauch, Nolan, Neale, Nies & Bronaugh
ATTORNEYS

Feb. 9, 1971  W. F. MAIDMENT  3,562,061
METAL WOOL PAD MAKING APPARATUS
Filed May 17, 1966  7 Sheets-Sheet 7

FIG. 12

INVENTOR.
WILLIAM FRANK MAIDMENT
BY
*Strauch, Nolan, Neale,*
*Nies & Bronaugh*
ATTORNEYS

United States Patent Office 3,562,061
Patented Feb. 9, 1971

3,562,061
METAL WOOL PAD MAKING APPARATUS
William F. Maidment, Burpham, Guilford, England, assignor to Colgate-Palmolive Company, New York, N.Y., a corporation of Delaware
Filed May 17, 1966, Ser. No. 550,856
Int. Cl. B05c 7/04; B23p 17/06; B26f 3/02
U.S. Cl. 156—357                                          19 Claims

ABSTRACT OF THE DISCLOSURE

Apparatus for continually making soap or detergent impregnated metal wool pads from a continuous web of said metal wool comprising means for positively feeding the web, means for periodically severing strips of predetermined length from the leading end of said web by rupturing the web under tension, means for forming said strips into rolls, cooperating punch and die means operable to confine a rolled strip between them and compress the roll into a pad, means for transferring said rolls from the roll forming means to said punch and die means in predetermined spaced succession, and means for injecting fluid soap or detergent into the compressed pad confined by the punch and die means.

---

This invention relates to the art of automatically making soap or detergent impregnated pads of metal wool or the like, and is particularly concerned with special apparatus having portions thereof operated in synchronism for the continual production of impregnated pads.

In its preferred embodiment the invention will be described with reference to apparatus wherein a continuous web of steel or other metal wool is severed in a novel manner into suitable length strips which are individually rolled and transferred in a novel manner into a novel punch and die assembly that confines and compresses the formed roll into the desired pad and injects liquid soap or detergent into the confined pad, all of these parts being operated in timed relation so that the entering web of metal wool is converted into a continual series of formed impregnated pads discharged from the apparatus, and it is a major object of the invention to provide such apparatus.

It is another object of the invention to provide a novel method and apparatus for severing individual strips of predetermined length in succession from a web of metal wool wherein the web is fed in a predetermined direction and the leading end section is periodically subjected to a reverse feed action that severs it from the web.

Another object of the invention is to provide novel apparatus for severing successive lengths of metal wool from a continuous web wherein the leading end section of the web during feeding is periodically pulled from the web by means acting opposite to the direction of said web feeding. Pursuant to this object a novel rocker arm and feed control assembly for the web is provided.

A further object of the invention is to provide a novel apparatus for transfer of rolled strips of metal wool between a strip rolling device and a punch and die assembly for further processing the formed roll.

It is another object of the invention to provide a novel metal wool roll transfer apparatus comprising a rotatable member having resilient annular arms for gripping the roll. A related object of this invention is the novel association of this transfer apparatus with steel wool strip rolling device whereby said resilient arms are opened to receive the roll discharged from said rolling device.

A further object of the invention is to provide a novel rolled metal wool strip transfer wheel having flexible sides for gripping the ends of the roll.

It is a further object of the invention to provide a novel apparatus for properly spacing feed of metal wool rolls for timed delivery into a punch and die assembly. Pursuant to this object the invention contemplates roll positioning members operated in timed relation to control delivery of the rolls by the transfer device.

Another device of the invention is to provide in novel combination a special die construction and associated special punch construction wherein a roll of metal wool is compressed to pad form and impregnated with a charge of liquid soap or detergent, the punch and die being periodically brought together in timed relation with delivery of a steel wool roll thereto. Pursuant to this object the invention contemplates a novel arrangement whereby no liquid soap is discharged should there be no steel roll between the punch and die when they come together, a novel die construction including magnetic holding of the roll when it is steel wool and a novel punch construction including valving that is opened only by the pressures of a compressed steel wool pad between the punch and die.

Further objects of the invention comprise details of the foregoing including their synchronization for the continual production of formed impregnated metal wool pads, and such will be apparent from the appended claims and the annexed drawings wherein:

Figure 1:
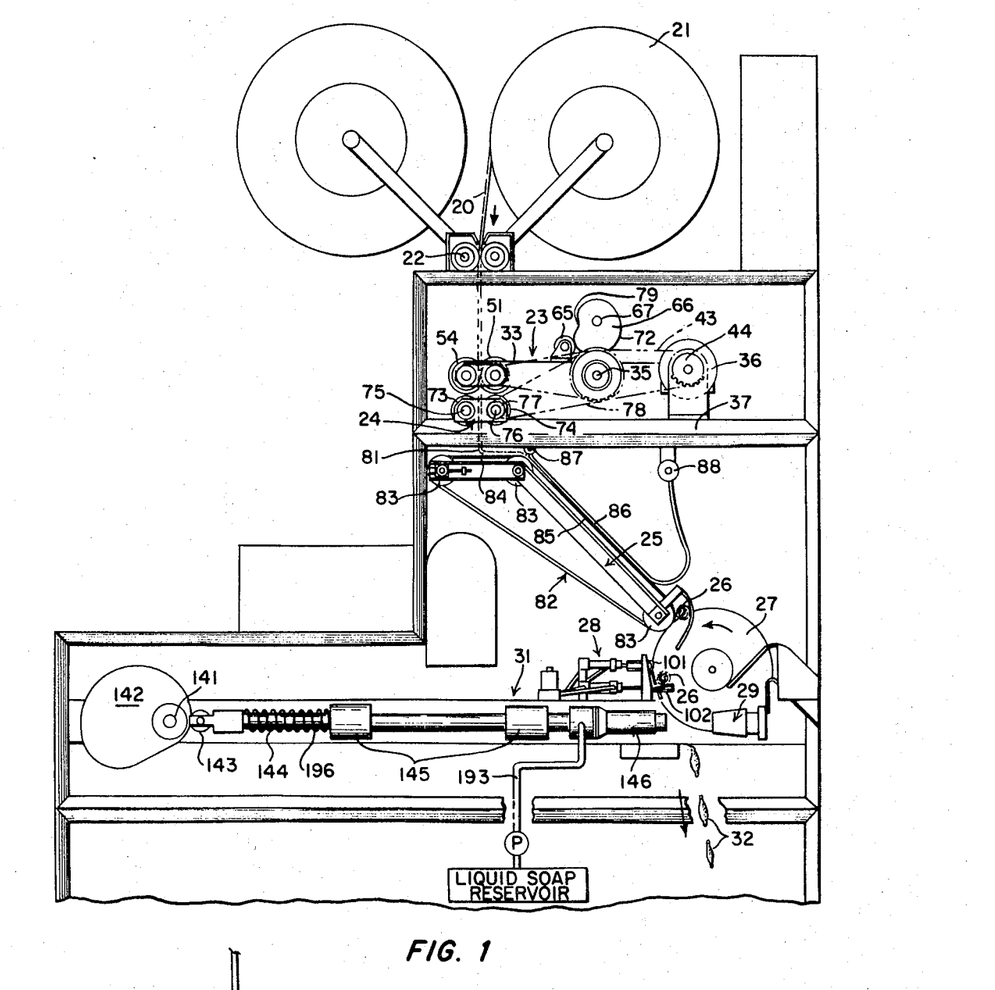
FIG. 1 is a side elevation showing pad forming apparatus according to a preferred embodiment of the invention.

FIG. 1 illustrates apparatus whereby a steel wool web is continually converted into impregnated steel wool pads. The steel wool is supplied in continuous web form as at 20 wound upon a rotatable supply reel 21. Reel 21 may be provided with a suitable friction brake to control the unwinding speed of the web. Web 20 passes through an idle roller pass 22 and thence downwardly to a strip severing mechanism indicated at 23 where, as will appear, predetermined strip lengths are successively severed from the leading end. These severed strips are delivered by a feed roll pass 24 to a strip rolling mechanism 25 where they are wound into rolls 26 that are picked up by a continuously rotatable transfer wheel 27.

At one side of transfer wheel 27 is disposed a spacing mechanism 28 that insures equal spacing of the rolls 26 being fed by the transfer wheel toward the pad forming and soap injection arrangement. At the lower end of transfer wheel 27, each roll 26 is in turn delivered to a relatively stationary holding die 29 cooperating with a punch assembly 31 having a liquid soap injection mechanism.

After being impregnated with soap, the finished compressed pad 32 is released and drops down to a bin conveyor or the like for ultimate packaging.

Figures 2, 5:
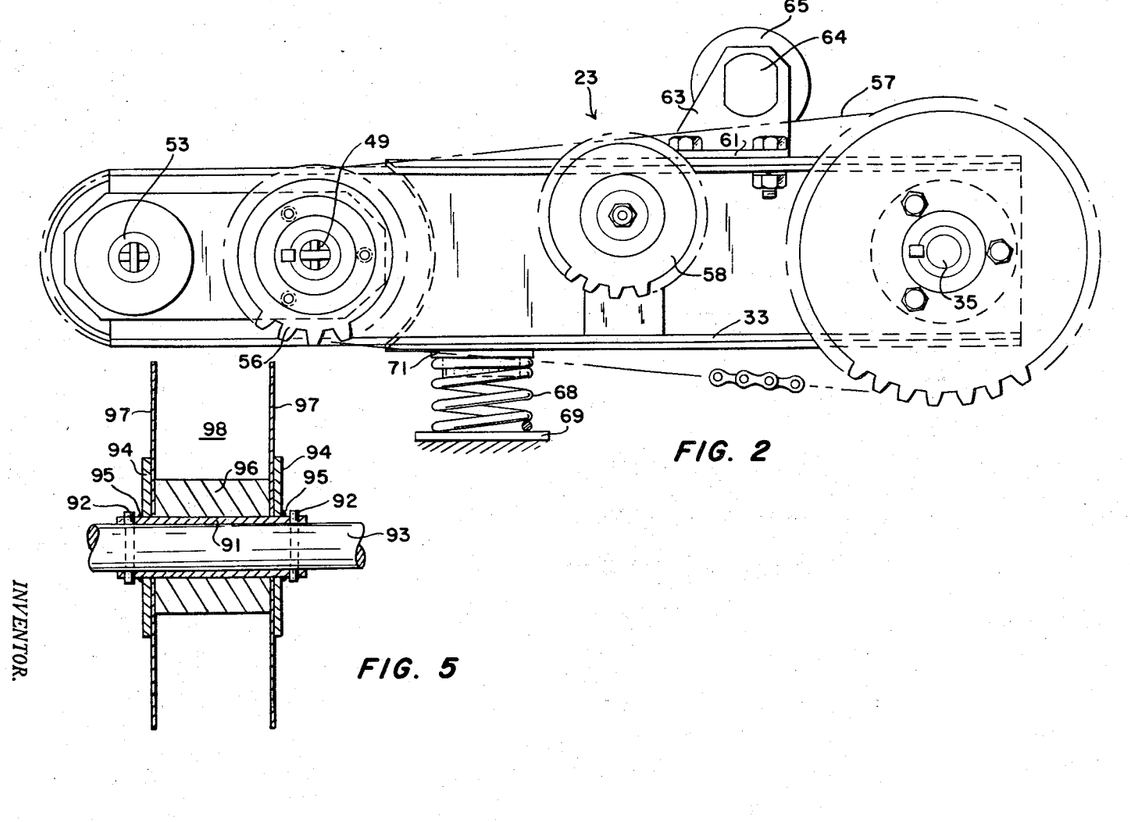
FIG. 2 is an enlarged fragmentary view in side elevation showing details of the strip severing mechanism.
FIG. 5 is a fragmentary sectional view showing the transfer wheel for transferring the rolls of steel wool to the soap injection die mechanism.
Figure 3:
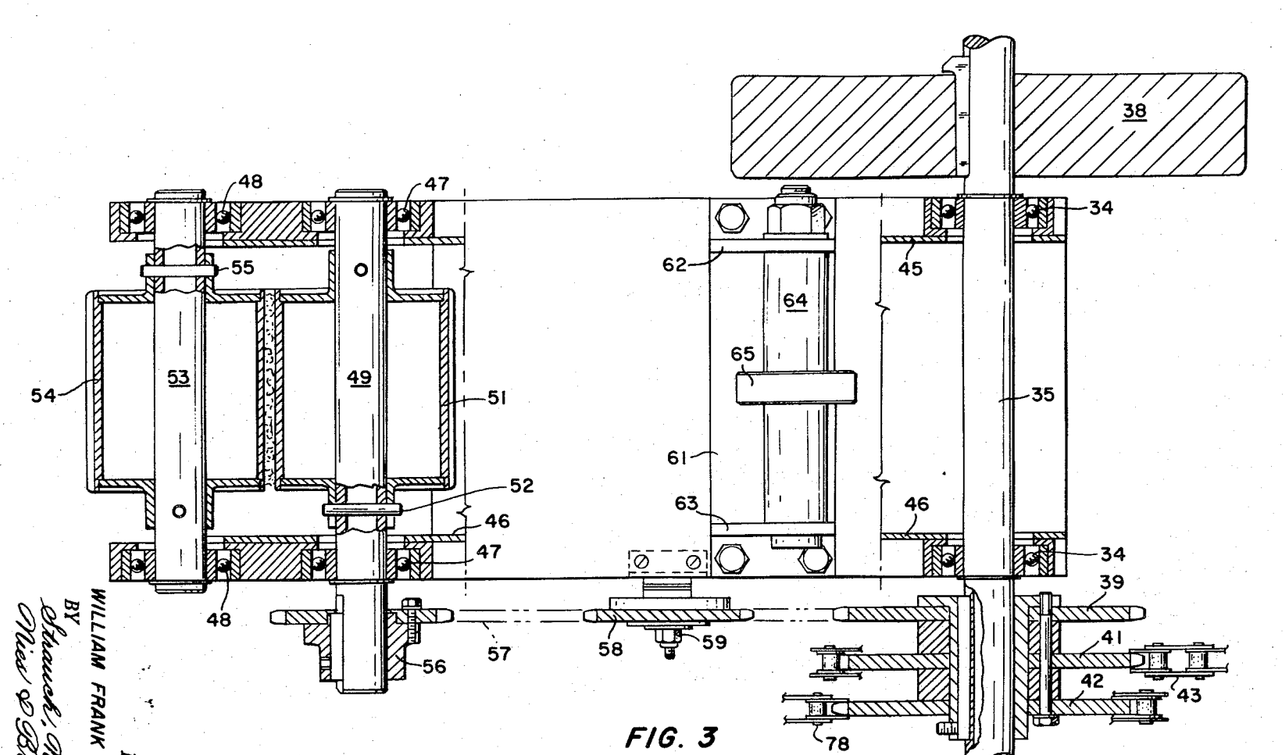
FIG. 3 is a plan view mainly in section showing further details of the mechanism of FIG. 2.

Referring to FIGS. 1–3, severing mechanism 23 comprises a breaker arm 33 that is pivotally mounted about a fixed horizontal axis, being journaled by bearings 34 upon a shaft 35 which is continuously driven by a suitable motor and variable speed unit 36 mounted on the machine frame 37. Shaft 35 is suitably rotatably mounted on frame 37 by bearing mounts (not shown). At one side of arm 33, shaft 35 carries a flywheel 38 to provide smooth uniform speed rotation, and at the other side of the arm a series of three sprockets 39, 41 and 42 of the same size are non-rotatably secured to shaft 35. Sprocket 41 is connected by chain 43 to a sprocket 44 on the output shaft of motor 36, for driving shaft 35.

Arm 33 comprises rigid parallel side plates 45 and 46 that mount the outer races of bearings 34 at the pivoted end of the arm, and these plates also mount parallel spaced sets of aligned bearings 47 and 48 as shown in FIG. 3. Bearings 47 rotatably mount a shaft 49 upon which a roller 51 is non-rotatably secured between the plates as by pins 52. Bearings 48 rotatably mount a shaft 53 upon which a roller 54 is non-rotatably mounted as by pins 55. Shafts 49 and 53 are parallel to shaft 35, and the rollers 51 and 54 have their peripheries suitably formed and spaced apart for gripping the steel wool strip during feeding and severing as will appear.

At one end, shaft 49 projects from arm 33 to mount a sprocket 56 that is connected by chain 57 to sprocket 39 whereby roller 51 is power driven during machine operation. An idler sprocket 58 adjustably mounted on arm 33 as at 59 engages drive chain 57 and may be shifted to regulate the tension of the chain.

As shown in FIGS. 2 and 3, a plate 61 rigidly bridges arm 33 and has upstanding lugs 62 and 63 in which are mounted a shaft 64 carrying a freely rotatable cam follower roll 65. As shown in FIG. 1, follower roll 65 engages a contour cam 66 on a shaft 67 suitably rotated by drive means (not shown) separate from the motor unit at 36 but in synchronism with the other elements of the machine as will appear. The axes of cam shaft 67, roller 65 and shaft 35 are parallel.

In operation, arm 33 oscillates about the axis of shaft 35 under control of cam 66 and a suitable opposing resilient means such as spring 68 shown in FIG. 2 compressed between a fixed frame part 69 and a seat 71 on the lower side of arm 33. FIG. 1 shows the arm 33 in its lowermost position of operation wherein arm 33 extends substantially horizontally and is held there stationarily by high surface 72 of cam 66 engaging roller 65. During this period, the roller pass 51, 54 feeds web 20 downwardly in the machine toward the feed roller pass 24.

At pass 24, rollers 73 and 74 are mounted on parallel shafts 75 and 76 similarly to rollers 51 and 54, but with shafts 75 and 76 journaled to rotate on fixed parallel axes on the machine frame 37, and shaft 76 carries a sprocket 77 connected by drive chain 78 to sprocket 42 on shaft 35. When breaker arm 33 is in the generally horizontal stationary position of FIG. 1, the peripheral space between rollers 51 and 54 is directly vertically above the peripheral space between feed rollers 73 and 74, and since rollers 51 and 74 are continuously driven at the same peripheral speed both sets of rollers advance web 20 downwardly at the same rate.

As cam 66 rotates, the depressed surface 79 encounters follower 65 and this permits the arm 33 to be quickly swung bodily with substantially a snap action through a short arc clockwise about shaft 35 in FIG. 1 under the influence of expanding spring 68 which had been held compressed by the cam action.

At the time this periodic upward rocking of arm 33 starts to take place, web 20 is gripped tightly in feeding engagement at spaced vertical regions along its length equal to the vertical distance between horizontal planes containing rollers 74 and 75 and rollers 51 and 54, and web 20 is moving down at a certain linear speed.

As arm 33 rocks upwardly, its feed rollers 51, 54 retain their grip on web 20 and, even though they continue to rotate and feed the web, they shift their gripped region abruptly away from the gripped region between rollers 73 and 74, with the result that the web length between the roller pairs 51, 54 and 73, 74 is placed under tension in a direction reverse to feeding sufficient to cause rupture and severance of the web in the vertical space between the roller pairs. The leading end section is thus torn off web 20 to provide a strip of desired length. The speed of rocking of arm 33 is much greater than the feed speed of the feed rollers. The length of the severed strips may be selected by varying the drive speed at 36 to adjust the web feed speed relative to the period of oscillation of arm 33.

After the strip has become so severed, fixed axis feed rollers 73, 74 continue to advance the severed strip length now indicated at 81 into the strip rolling mechanism 25.

As soon as cam 66 rotates further to engage the high section 72 with follower 65, arm 33 is swung back to its horizontal stationary position of FIG. 1, and the leading end of web 20 enters the roller pass 73, 74 from above so that initial web feed conditions are resumed. This action takes place cyclically, so that a series of severed strip lengths 81 are delivered in timed succession to rolling mechanism 25.

The surfaces of rollers 51, 54, 73, and 74 may be rubber covered or even corrugated or otherwise roughened for better gripping of web 20. The speeds of the rollers are selected in correlation with the timing of cam 66 to produce substantially uniform pad lengths 81. As shown, at least rollers 51 and 54 and their shafts may be hollow for reducing the mass of the oscillating arm 33.

The vertical separation of the roller passes 51, 54 and 73, 74 necessary for the invention requires only a small arc of movement of the free end of arm 33 which does not materially depart from the vertical path of feed of the web.

The strip rolling mechanism at 25 comprises essentially an endless belt 82 supported on suitable rollers 83 at least one of which is driven to move the belt clockwise in FIG. 1. Belt 82 has a horizontal upper flight 84 onto which the severed strip lengths 81 drop in spaced succession. This flight 84 extends between horizontally aligned rollers 83, and at 80 the belt turns over a relatively sharp bend to a downwardly inclined flight 85. Overlying flight 85 is a length of relatively stationary belt 86 attached at opposite ends 87 and 88 to the frame from which it is suspended. Each severed strip 81 is rolled into a coil about a transverse axis as it is carried down flight 85 under belt 86, and it emerges as a wound roll of steel wool 26 as indicated in FIG. 1. It has been found that provision of the sharp bend 80 in the moving belt results in rolls 26 of more uniform dimensions.

Figure 4:
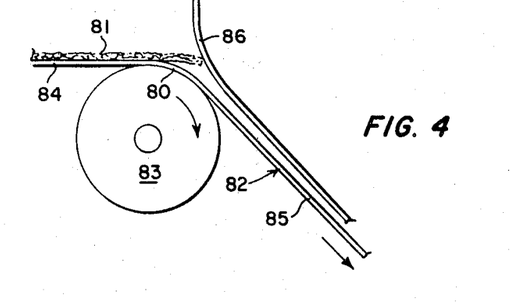
FIG. 4 is a fragmentary view illustrating advance of a severed strip of steel wool into the roll forming station.

FIG. 4 shows diagrammatically the action of bend 80 in the moving belt 82 in improving the strip rolling action. As the severed strip 81 moves along flight 84, its leading edge projects over bend 80 to encounter and be arrested temporarily by the stationary belt 86. This insures that the rolling of strip 81 upon itself starts immediately since the trailing end continues to be moved by the belt flight 84, so that substantially uniform size rolls 26 are produced at 25, and the foregoing provides an improved mode of rolling steel wool strips over such prior devices as Martin, Pat. No. 1,859,310 for example wherein no such abrupt bend in the moving belt is provided.

FIG. 5 shows the transfer wheel 27 in some detail. It comprises a rigid collar 91 non-rotatably secured as by pins 92 to a motor driven continuously rotated shaft 93. A pair of relatively stiff annular plates 94 are fixed in axially spaced relation on collar 91 as by welding at 95, and the central section of collar 91 is surrounded by a rigid annular block 96. Thin annular plates 97 of relatively flexible spring steel are axially clamped tightly between plates 94 and block 96, and plates 97 extend sufficiently outwardly of block 96 to form a continuous outwardly open annular mouth indicated at 98.

Figure 6:
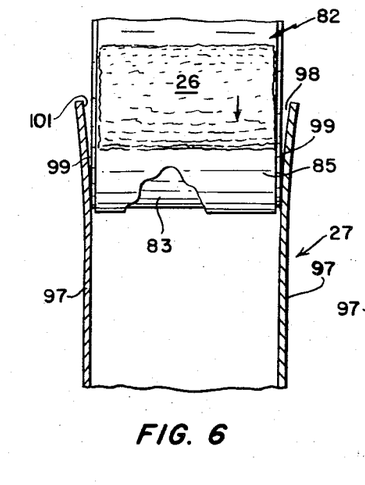
FIG. 6 is an enlarged fragmentary section showing the action of the belt feed end roller in opening the transfer wheel to receive the formed rolls.
Figure 7:
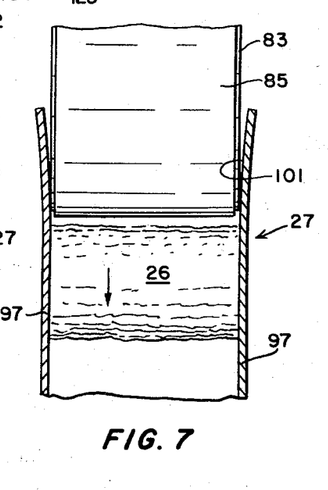
FIG. 7 is a section similar to FIG. 6 showing the formed rolls gripped by the transfer wheel side walls.

FIGS. 6 and 7 illustrate transfer of the roll 26 to transfer wheel 27. The lower belt support roller 83 extends slightly within mouth 98 and has parallel flat end surfaces 99 that engage the inner sides 101 of the flexible plates 97 to thereby flex these plates outwardly to sufficiently open the mouth at that region sufficiently to accept a roll 26 coming off the lower end of belt flight 85. The relaxed distance between plate surfaces 101 is less than the length of roll 26, so that after the roll has become disposed between plates 97 as shown in FIG. 7 and then carried downwardly away from roll mechanism 25 by rotation of wheel 27 plates 97 spring back to grip the roll between them and feed it positively toward the spacing device 28.

By providing an axially rigid large area support for flexible plates 97, as by plates 94 and block 96, flexure of the plates 97 is controlled to take place only at mouth 98.

Figures 8, 9:
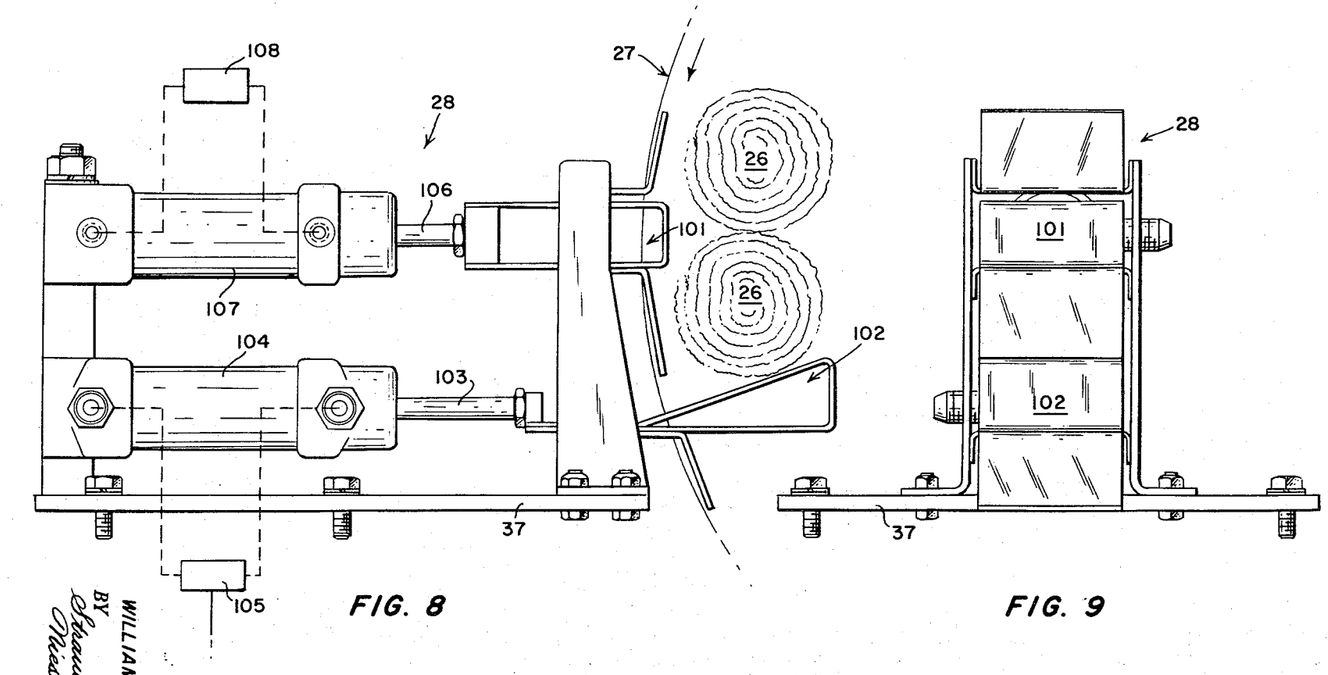
FIG. 8 is an enlarged side elevation of the roll spacing and arresting mechanism.
FIG. 9 is an end view of the mechanism of FIG. 8.

FIGS. 1, 8 and 9 show at 28 mechanism for assuring that steel wool rolls 26 gripped by transfer wheel 27 are fed to the die 29 only in proper spaced relation and at the proper time to enable continual production. The device at 28 comprises roll control gates 101 and 102 which are mounted one above the other adjacent the lower end of transfer wheel 27. Lower gate 102 is mounted on a plunger rod 103 projecting from a reversible hydraulic or air cylinder 104. Gate 102 is periodically projected within the periphery of wheel 27 to intercept and restrain feed of a roll 26 and withdrawn to permit the passage of a roll toward the die 29. The projected position of gate 102 is shown in FIG. 8 and, while roll 26 is being arrested by gate 102, wheel 27 continues to rotate with surfaces 101 frictionally sliding past the ends of arrested roll 26. When cylinder 104 is actuated, as by the reversing valve control shown at 105, gate 102 is withdrawn and roll 26 is moved to die 29 as will appear.

Upper gate 101 is also mounted on a plunger rod 106 projecting from a reversible hydraulic or air cylinder 107. Gate 101 is normally in the retracted FIG. 8 position but is periodically projected within wheel 27 as by a suitable reversing valve control indicated at 108. Valves 105 and 108 are so relatively synchronized that gate 101 is projected into wheel 27 just before gate 102 is withdrawn, so as to deflect inwardly of the wheel any roll 26 that might be closely following that arrested at gate 102 and to arrest any following roll. Gate 101 is then withdrawn after gate 102 is next projected into wheel 27.

The foregoing insures that only one roll 26 at a time in proper spacing is fed to the die assembly 29, and excess rolls displaced inwardly by gate 101 are suitably ejected from wheel 27 by a deflector (not shown).

Figure 10:
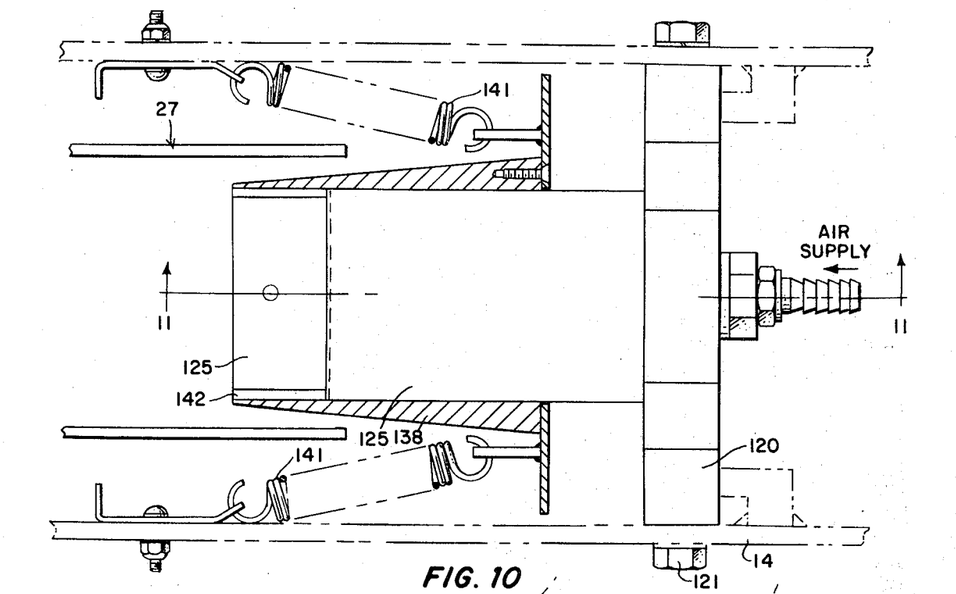
FIG. 10 is an enlarged top view partly in section showing the roll holding die part at the lower end of the transfer wheel.
Figure 11:
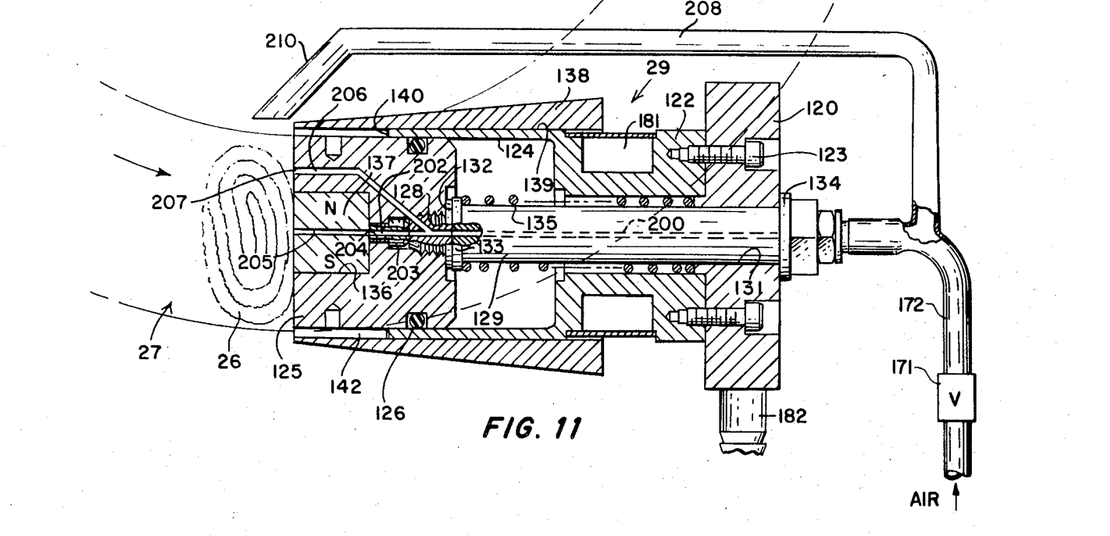
FIG. 11 is a section in elevation through the die part of FIG. 10, showing the magnetic roll holder.

Referring to FIGS. 1, 10 and 11 the stationary die assembly 29 projects into transfer wheel 27 so as to lie in the path of a properly fed steel wool roll 26 which it intercepts and removes from the rotating feed wheel.

The die head comprises a mounting block 120 suitably bolted to the machine frame as at 121. A cylinder 122 is secured to block 120 as by screws 123 and is formed with a cylindrical bore 124 within which is slidably mounted a piston 125. A resilient O-ring peripheral seal 126 is provided between the piston and cylinder.

At its rear end, piston 125 is formed with a central threaded bore which receives and anchors the hollow threaded end 128 of a tube 129 that projects slidably through bore 131 in block 120. A lock washer 132 is compressed between piston 125 and an enlarged annular tube flange 133, and a second enlarged annular tube flange 134 is adapted to engage the back face of block 120. A spring 135 surrounds tube 129 to bias the piston 125 and attached tube 129 to the illustrated FIG. 11 position.

At its forward end piston 125 is recessed at 136 to mount a permanent magnet 137. The front face of magnet 137 is substantially flush with the front face of piston 125.

A hollow die sleeve 138 is externally axially slidably mounted on the outer cylindrical surface 139 of cylinder 122 and, see FIG. 10, die sleeve 138 is connected to the machine frame by a pair of diametrically opposite springs 141 that yieldably restrain movement of the die sleeve 138 to the right in FIGS. 10 and 11. In its normal relaxed position of FIG. 11, die sleeve 138 surrounds the front end of piston 125 to define a narrow annular space 142 therebetween. Within space 142, the axial edge of the cylinder is toothed or serrated at 140.

FIG. 11 shows the condition of the die parts at 29 when a steel wool roll 26 has been intercepted by it, and retained thereon by magnet 137.

At this time the punch and soap injection mechanism 31 is automatically activated. A driven shaft 141 rotates a profile cam 142 engaged with a follower roll 143 on the end of rod 144 slidably mounted on the frame at 145 and carrying the punch mechanism 146.

Figure 12:
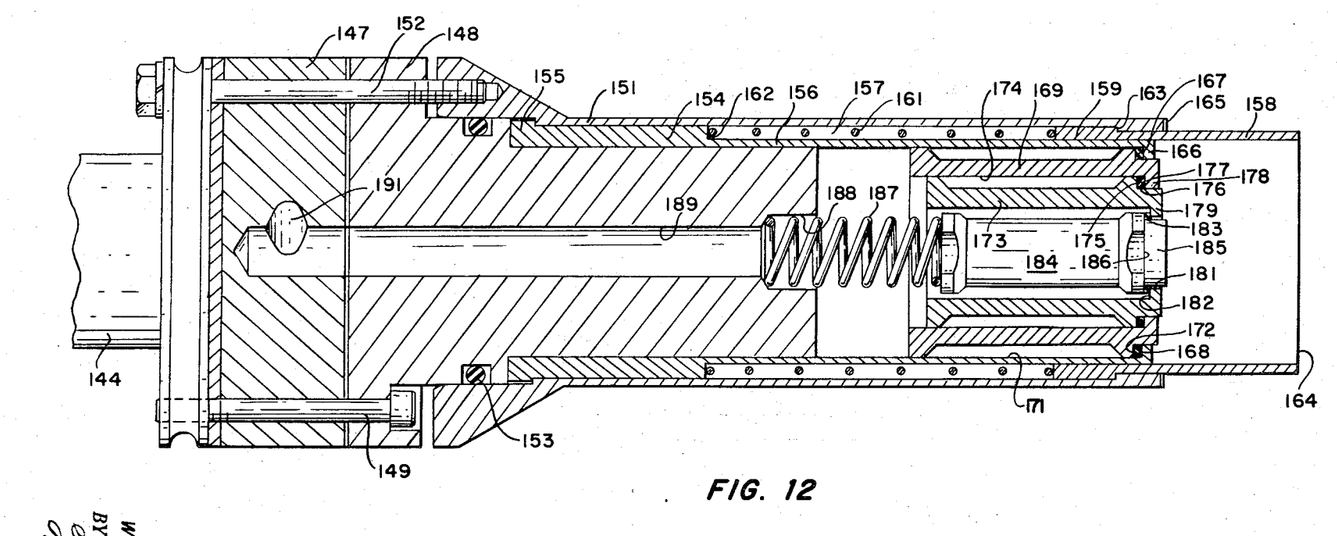
FIG. 12 is an enlarged section through the punch mechanism showing the soap valving action.

FIG. 12 shows the relaxed punch and soap ejection mechanism 146 in detail as it appears prior to engagement with the die head 29. A manifold 147 and a projecting punch member 148 are secured to the end of rod 144 as by screws 149. A hollow outer sleeve 151 is also secured in fixed relation surrounding member 148, as by screws 152, with a static O-ring seal 153 between them. A hollow inner sleeve 154 has its enlarged inner end 155 axially trapped between member 148 and sleeve 151 and is formed with a reduced diameter portion 156 providing an annular space 157 between member 148 and sleeve 151. Thus in the assembly rod 144, manifold 147, member 148 and sleeves 151 and 154 are rigidly secured together to reciprocate as a unit.

A hollow plunger sleeve 158 has its enlarged inner end 159 slidably mounted in space 157, and sleeve 158 is normally urged outwardly to its limit FIG. 12 extended position by a spring 161 compressed between the plunger and an axially facing shoulder 162 on sleeve 154. Outward projection of sleeve 158 is arrested by internal shoulder 163 on outer sleeve 151. The front edge 164 of sleeve 158 lies in a plane at right angles to its axis.

The end 165 of outer sleeve 151 is toothed or serrated for a purpose to appear.

At its outer end inner sleeve 154 is formed with an inturned annular flange 166 having an axially facing inner face 167 seating a resilient seal annulus 168. An annular plunger element 169 is axially slidably mounted within the inner bore 171 of sleeve 154, and has an axial face 172 engaging annulus 168. A second annular plunger element 173 is slidably mounted within the bore 174 of element 169, and is provided with an axial face 175 engaging one side of a resilient seal annulus 176 seated against an axial face 177 on an inturned end flange 178 of element 169.

The forward end of plunger element 173 is formed with an inturned annular flange 179 defining a smooth cylindrical bore 181 surrounded at its inner side by an annular axial face 182 upon which is seated a resilient seal annulus 183.

A central solid plunger element 184 has a cylindrical front end 185 slidably mounted in bore 181 and an axial face 186 engaging annulus 183. A compression spring 187 extends from a recess 188 in member 148 to the end of element 184. In the normal non-operative condition of the parts shown in FIG. 12, spring 187 is of sufficient strength to urge the several plunger elements in turn tightly against the respective sealing annuli 183, 176 and 168 to essentially provide a closed valve condition at the plunger head wherein the cylindrical end 185 of the central element projects a slight distance forwardly.

Figure 14:
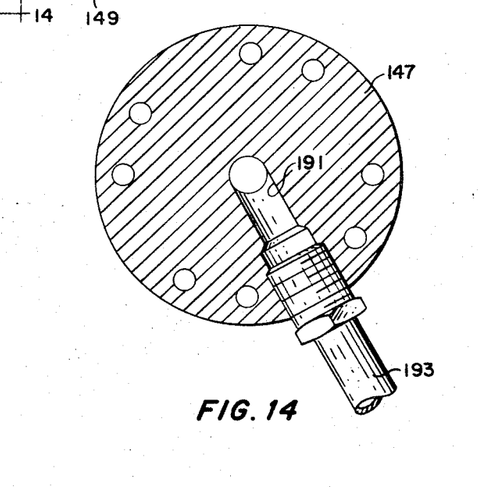
FIG. 14 is a section on line 14—14 of FIG. 13 showing the liquid soap inlet to the injection plunger.

Recess 188 is open to an axial passage 189 leading to a radial manifold passage 191 (FIG. 14) connected by flexible conduit 193 to a pump and reservoir source of liquid soap, and it can be seen that the composite plunger head and soap valving unit is normally maintained closed and sealed by spring 187 to arrest discharge of liquid soap through the plunger assembly.

Figure 13:
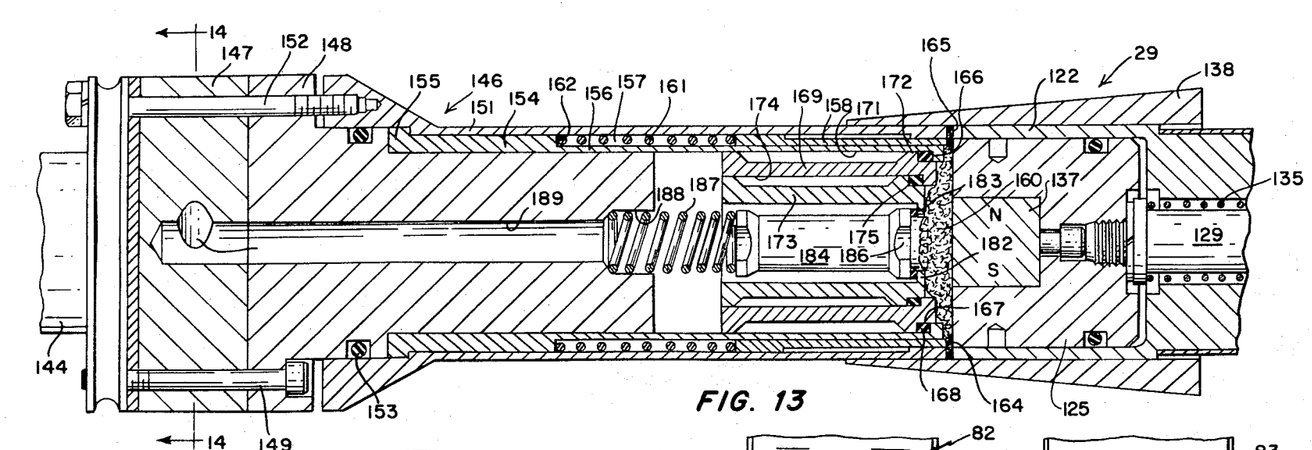
FIG. 13 is a plan view in section showing the arrangement of parts when a rolled steel wool pad has been gripped between the punch and die for soap injection.

As the plunger mechanism 146 and the die head 29 come together axially with the steel wool roll 26 between them toward the condition shown in FIG. 13, rim 164 of plunger sleeve 158 engages the roll 26 adjacent its periphery and pushes it toward and within die sleeves 138. This centers the roll 26 within the die assembly. During this operation piston 125 is retracted within bore 124 against the force of spring 135, and plunger sleeve 158 also retracts within the space 157 against the force of spring 161.

Plunger movement continues until the forward toothed end 165 of outer plunger sleeve 151 has entered within the die sleeve 138 and clamped the outer periphery of the steel wool roll against the relatively fixed serrated cylinder end 140. This crimps the roll around its outer edges to form a tight bead, and the interior of the roll 26 is compressed within the confined space 160 within the engaged die and plunger ends.

By the time that the plunger structure has gripped the outer periphery of the roll between crimping edges 140 and 165, the composite plunger head structure cooperating with piston 125 has compressed the roll 26 between them, and the compressed roll is of sufficient thickness that the several axially movable plunger elements engaged thereby are displaced to the left in FIG. 13 sufficiently to break the seals at 183, 176 and 168 to permit liquid soap under pump pressure being supplied through the manifold and passage 189 to be injected in timed relation into the compressed roll 26 with considerable force.

If there is no roll 26 compressed between the plunger head and piston 125, there will be no relative axial displacement of the plunger head elements, the seals at 183, 176 and 168 will remain tight and there will be no discharge of soap from the plunger.

When cam 142 has rotated sufficient to bring its low profile back to original position, rod 144 retracts under the force of a spring such as that shown at 196, thereby disengaging the plunger from the die. Upon disengagement the internal die and plunger parts return to normal condition, and the formed impregnated pad 32 is ejected. This cycle is repeated periodically with each revolution of cam 142.

During disengagement of punch 146 from head 29, piston 125 will shift to the left in FIG. 13 toward its FIG. 11 position carrying before it the formed impregnated pad 32. At this time a valve 171 located in the flexible conduit 172 that connects tube 129 to a source of compressed air is opened for a sufficient period to discharge air under pressure against pad 32 with sufficient force to dislodge it from the holding action of magnet 137.

As shown in FIG. 11, the discharge air path comprises a longitudinal passage 200 through tube 129 and its reduced integral piston mounting end 182, a longitudinally aligned passage 202 in a ferrule 203 threaded into a central hollow piston bore 204, and a longitudinally aligned passage 205 through the magnet 137. For most purposes it is desirable to add a supplementary passage 206 through the piston bypassing the magnet to emerge as an air discharge port 207 radially inwardly of the magnet. This passage 206 may be used instead of passage 202, 205. Finally, to insure discharge of the pad, it is advantageous in some machines to provide an auxiliary air discharge conduit 208 which is connected into conduit 172 outside the die head 29 and projects into the space between the sides of transfer wheel 27 above die head 29 to terminate in a discharge nozzle 209 located to deliver a substantially radial outward blast of air onto the pad.

Preferably the nozzle 209 is inclined so as to provide an inclined surface 210 that serves to intercept and remove any steel wool rolls that have been deflected inwardly by the foregoing described action of gate 101.

The wall of die cylinder 122 is formed with a water jacket space 181 connected to an inlet 182 from a suitable source of hot water, whereby the die assembly at 29 is maintained heated during operation. This prevents the soap or detergent from caking or hardening and insures trouble-free operation.

During operation of the foregoing apparatus, the various parts are driven in timed relation so that with web 20 entering at a constant velocity a continual series of completed pads 32 is discharged at a known rate. The speed of belt 82 is correlated to the lengths and rate of delivery of strips 81, and the speed of wheel 27 is correlated with both belt 82 and the action of cam 142 in bringing the punch and die together. Preferably the soap pump is so driven that it exerts an increased pressure pulse in the soap circuit through passage 189 at the time the punch and die are engaged as in FIG. 13 for optimum impregnation of the compressed pad. The air blast dislodging the compressed pad from the die 29 is timed to take place just after separation of the punch and die during their reciprocation and engaging cycle.

What is claimed and desired to be secured by Letters Patent is:

1. Apparatus for severing predetermined length strips in succession from a continuous web of metal wool comprising feed means for advancing the web in a predetermined direction, web gripping and tensioning means movably mounted in said apparatus and operatively engaging said web in a region in advance of said feed means, and means periodically displacing said web gripping and tensioning means in the direction opposite to said predetermined direction of feed to subject the web between said region and said feed means to sufficient tension to transversely rupture the web, said web gripping and tensioning means having such association with said web as not to restrain feed of the web by said feed means during the periods between said actuation thereof.

2. In the apparatus defined in claim 1, said web gripping and tensioning means comprising a continuously driven feed roller pass for the web, said feed roller pass being mounted on a support that is movable toward and away from said feed means, and means is provided for controllably displacing said support in said opposite directions.

3. The apparatus defined in claim 1, wherein said web gripping and tensioning means is a member rockable about a fixed pivot and carrying means for feeding the web in said predetermined direction at the same speed as said feed means, and said actuating means comprises cam means for controlling rocking movement of said member.

4. The apparatus defined in claim 1, wherein said feed means is a first pair of web gripping rollers rotatable on fixed axes and said web gripping and tensioning means is a member rockable about a fixed axis and carrying a second pair of web gripping rollers, and means is provided for rotating at least one roller of each pair at the same peripheral speed.

5. Apparatus for continually making soap or detergent impregnated metal wool pads from a continuous web of said metal wool comprising means for positively feeding the web, means for periodically severing strips of predetermined length from the leading end of said web, means for forming said strips into rolls, cooperating punch and die means operable to confine a rolled strip between them and compress the roll into a pad, means for transferring said rolls from the roll forming means to said punch and die means in predetermined spaced succession, and means for injecting fluid soap or detergent into the compressed pad confined between said punch and die means.

6. In the apparatus defined in claim 5, means for actuating said punch and die means to release said pad, and means for directing a fluid pressure stream to insure removal of said released pad from said punch and die means.

7. In the apparatus defined in claim 5, said punch and die means comprising means crimping the periphery of the pad therein into a relatively tight bead while compressing the body of the pad within a confined space prior to injection of said fluid soap or detergent.

8. Apparatus for continually making soap or detergent impregnated metal wool pads from a continuous web of said metal wool comprising means for positively feeding the web, means for periodically severing strips of predetermined length from the leading end of which web, means for forming said strips into rolls, cooperating punch and die means operable to confine a rolled strip between them and compress the roll into a pad, and means for transferring said rolls from the roll forming means to said punch and die means in predetermined spaced succession, said roll forming means comprising an endless driven belt having a substantially horizontal flight receiving the severed strips from said feed means connected by an abrupt bend to a downwardly inclined flight, and means defining a relatively stationary surface extending along said inclined flight so disposed that the leading end of a strip moving along said horizontal flight encounters said surface before the strip enters the roll forming space between said surface and said inclined flight.

9. Apparatus for continually making soap or detergent impregnated metal wool pads from a continuous web of said metal wool comprising means for positively feeding the web, means for periodically severing strips of predetermined length from the leading end of said web, means for forming said strips into rolls, cooperating punch and die means operable to confine a rolled strip between them and compress the roll into a pad, and means for transferring said rolls from the roll forming means to said punch and die means in predetermined spaced succession, said transfer means being a rotatable wheel having flexible sides between which said rolls are delivered from said roll forming means and from which said rolls are extracted by said punch and die means.

10. In the apparatus defined in claim 9, means in said roll forming means operably associated with said wheel for separating said flexible sides to receive the delivered rolls.

11. Apparatus for continually making soap or detergent impregnated metal wool pads from a continuous web of said metal wool comprising means for positively feeding the web, means for periodically severing strips of predetermined length from the leading end of said web, means for forming said strips into rolls, cooperating punch and die means operable to confine a rolled strip between them and compress the roll into a pad, means for transferring said rolls from the roll forming means to said punch and die means in predetermined spaced succession, and means for injecting fluid soap or detergent into the compressed pad confined between said punch and die means, said injecting means being responsive only to the presence of a compressed pad between the punch and die means whereby there is no injection of soap or detergent when there is no metal wool roll being compressed by said punch and die means.

12. In the apparatus defined in claim 11, said injecting means comprising a passage in said punch and die means connected to a source of fluid soap or detergent under pressure, and normally closed valve means in said passage adapted to contact and be opened by the compressed pad within the punch and die means.

13. Apparatus for continually making soap or detergent impregnated metal wool pads from a continuous web of said metal wool comprising means for positively feeding the web, means for periodically severing strips of predetermined length from the leading end of said web, means for forming said strips into rolls, cooperating punch and die means operable to confine a rolled strip between them and compress the roll into a pad, magnetic means in said punch and die means for retaining transferred rolls of steel or other magnetic material to be compressed, means for transferring said rolls from the roll forming means to said punch and die means in predetermined spaced succession, and means for injecting fluid soap or detergent into the compressed pad confined between said punch and die means.

14. Apparatus for continually making soap or detergent impregnated metal wool pads from a continuous web of said metal wool comprising means for positively feeding the web, means for periodically severing strips of predetermined length from the leading end of said web, means for forming said strips into rolls, cooperating punch and die means operable to confine a rolled strip between them and compress the roll into a pad, means for transferring them and compress the roll into a pad, means for transferring said rolls from the roll forming means to said punch and die means in predetermined spaced succession, and means for injecting fluid soap or detergent into the compressed pad confined between said punch and die means, said punch and die means comprising a relatively stationary die and a reciprocably actuated punch, said die and punch having interengaging sleeves defining a space wherein metal wool roll is confined and compressed, and means in the punch and die means responsive only to the presence of a compressed pad in said space for permitting injection of liquid soap or detergent into the pad.

15. In the apparatus defined in claim 14, said die extending into intercepting relation with a roll on said transfer means.

16. In the apparatus defined in claim 14, means for controlling the temperature of said die for preventing solidification of soap or detergent.

17. In the apparatus defined in claim 14, means for sequentially displacing the compressed pad from said punch and die means.

18. Apparatus for continually making soap or detergent impregnated metal wool pads from a continuous web of said metal wool comprising means for positively feeding the web, means for periodically severing strips of predetermined length from the leading end of said web, means for forming said strips into rolls, cooperating punch and die means operable to confine a rolled strip between them and compress the roll into a pad, and means for transferring said rolls from the roll forming means to said punch and die means in predetermined spaced succession, said transfer means being a rotatable flexible sided wheel adapted to frictionally grip said formed metal wool rolls and means for effecting uniformly spaced delivery of said rolls to the punch and die means comprising a stop gate periodically movable into and out of the space between said sides.

19. In the apparatus defined in claim 18, a second gate periodically movable into the space between said wheel sides for preventing more than one roll from being transferred to said punch and die means during the period said first gate is withdrawn.

(References on following page)

References Cited

UNITED STATES PATENTS

| | | | |
|---|---|---|---|
| 1,859,310 | 5/1932 | Martin | 140—71 |
| 1,968,310 | 7/1934 | Peterson | 29—419X |
| 2,903,389 | 9/1959 | Fujita | 264—128X |
| 3,103,031 | 9/1963 | Winston | 15—209.5X |
| 3,348,296 | 10/1967 | Demrick | 29—419 |

JOHN T. GOOLKASIAN, Primary Examiner

R. A. KILLWORTH, Assistant Examiner

U.S. Cl. X.R.

15—209.5; 18—30; 29—417, 419; 118—43; 140—71; 156—586, 587, 589; 225—101

UNITED STATES PATENT OFFICE
CERTIFICATE OF CORRECTION

Patent No. 3,562,061         Dated February 9, 1971

Inventor(s) W. F. Maidment

It is certified that error appears in the above-identified patent and that said Letters Patent are hereby corrected as shown below:

Column 4, line 74, delete "," after Martin

Column 10, lines 28 and 29, delete "means for transferring them and compress the roll into a pad,"

Column 10, line 37, insert -- said -- after "wherein"

Signed and sealed this 8th day of June 1971.

(SEAL)
Attest:

EDWARD M. FLETCHER, JR.
Attesting Officer

WILLIAM E. SCHUYLER,
Commissioner of Patent